INVENTOR.
Charles Stang, Jr.
BY
Harness, Dickey & Pierce
ATTORNEYS.

# United States Patent Office 3,412,650
Patented Nov. 26, 1968

3,412,650
SPRING RETAINER FOR PRESSURE REGULATOR
Charles Stang, Jr., Detroit Mich., assignor to Maxitrol Company, Southfield, Mich., a corporation of Michigan
Filed Aug. 22, 1966, Ser. No. 573,934
4 Claims. (Cl. 92—133)

My invention relates to automatic fluid pressure regulating valves, such as gas regulators, and, in particular, concerns a spring retainer for the diaphragm control spring of the valve.

In some gas regulator applications, it is desirable to be able to position the diaphragm control spring at any one of a plurality of settings wherein the exact value of the setting is predetermined. It is an object of this invention to provide a simple construction whereby this can be accomplished.

The invention provides for a plurality of different spring settings by means of a spring retainer cup that can be secured in different ones of fixed axial positions and thereby determine the standard force applied by the diaphragm spring to the diaphragm.

The invention is illustrated in the accompanying drawings in which.

Figure 1:
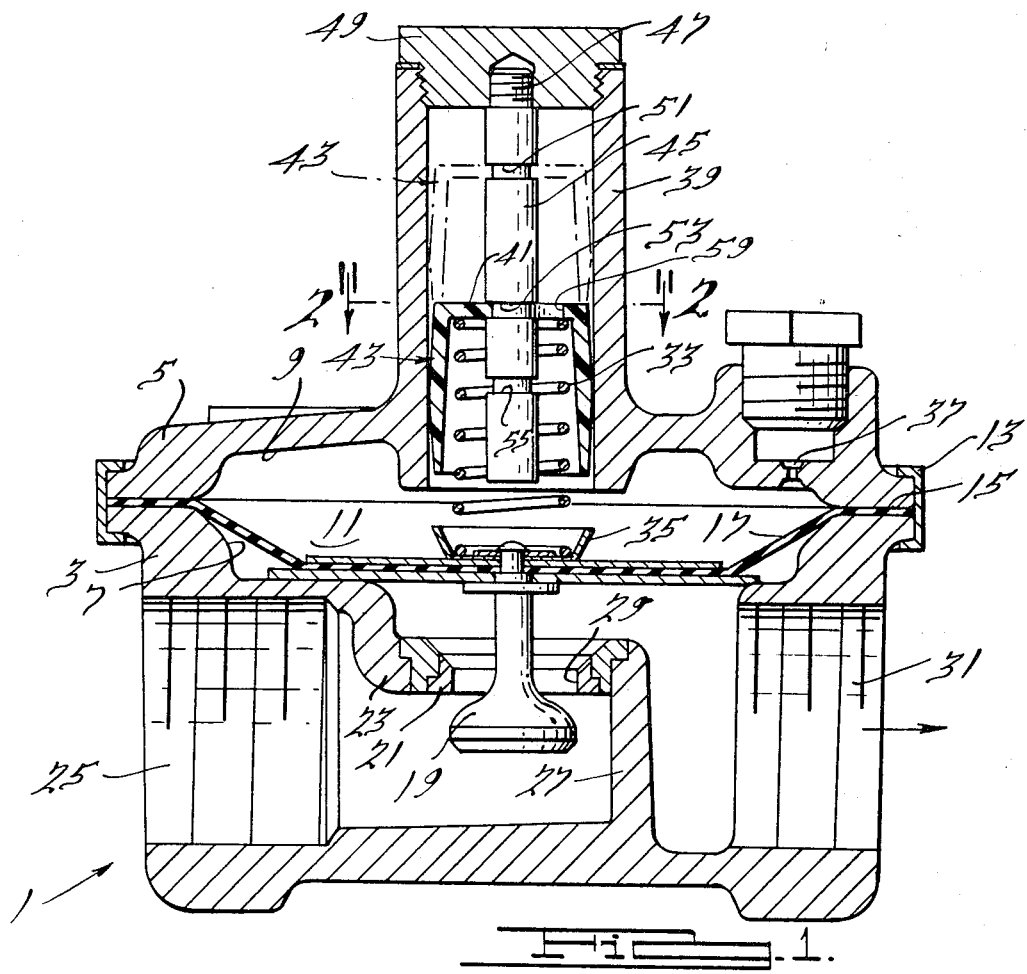
FIGURE 1 is a vertical cross section through one form of gas regulator valve embodying the invention.
Figure 2:
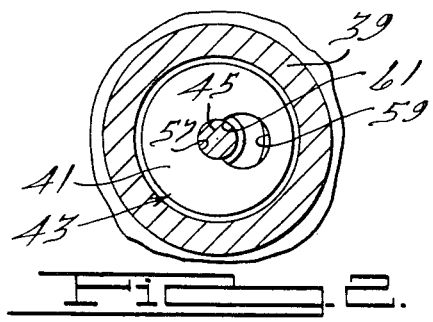
FIGURE 2 is a cross section along the line 2—2 of FIGURE 1.
Figure 3:
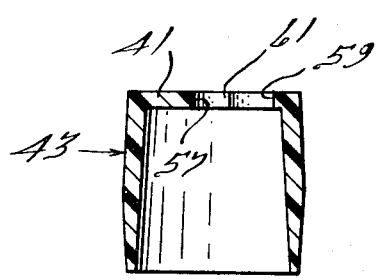
FIGURE 3 is a cross section through the retainer cup shown in FIGURE 1.
Figure 4:
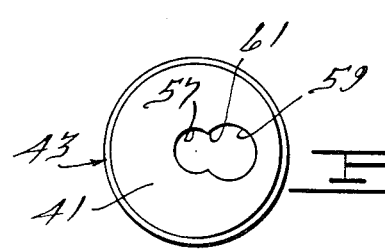
FIGURE 4 is a top plan view of the retainer cup shown in FIGURE 3.

The automatic gas regulator valve 1 has a lower body section 3 and an upper body section 5 which are recessed at 7 and 9, respectively, to form a diaphragm chamber 11. The upper and lower halves of the regulator are held together by a clamp ring 13 with the outer portion 15 of the flexible diaphragm 17 held tightly between them in a gas-tight joint. The diaphragm carries and controls the position of a valve member 19 which operates on a valve seat 21 that is formed in a horizontal wall 23 of the lower body section 3. The body section 3 has an inlet passage 25 which terminates at one end in a wall section 27 so that gas entering the regulator must flow by the valve element 19 through the opening 29 in the valve seat 21. It then enters the diaphragm chamber 11 below the diaphragm 17 where it reverses flow to pass out of the regulator through the outlet passage 31.

The position of the valve member 19 and its resistance to flow of the gas is determined by the balance of the forces provided by the upward gas pressure acting on the bottom of the diaphragm 17 and the downward pressure on top of the diaphragm 17 provided by a coil spring 33, which has its bottom end seated in the spring cup 35 that is attached to the diaphragm 17. Movement of the diaphragm 17 due to changes in pressure on it occurs freely in chamber 11 because of the vent hole 37 that communicates with the top of the diaphragm.

The spring 33 is disposed inside of the tubular spring stack 39 which is a part of the upper half 5 of the regulator. It reacts against the top wall 41 of an inverted cup-shaped retainer 43 which is mounted at a selected position on an alignment shaft 45 that is threaded at its top end 47 into the threaded plug 49 which is screwed into the top of the stack 39.

The shaft 45 has three reduced diameter grooves 51, 53 and 55 formed in it. The top wall 41 of the retainer cup 43 has an opening 57 located on its axis which is of a size to fit on the diameters 51, 53, and 55. Opening into the hole 7, the end wall has a larger opening 59 which is sized to pass the outer diameter of the alignment shaft 45. The cup 43 is formed of a somewhat resilient material such as nylon so that the neck 61 between the two openings 57 and 59 will expand to the diameter of the grooves and thereby permit the cup 43 to be laterally shifted so that the axis of opening 59 becomes aligned with the axis of the shaft 45.

The operation of the spring retainer cup 43 is self evident. In order to adjust the position of the cup 43, the plug 49 is unscrewed and removed from the stack which removes the alignment shaft 45 along with the cup 43. When these parts are removed, the cup 43 can be shifted laterally so that hole 59 is coaxial with the shaft 45 whereupon the cup can be moved to the desired groove. It is then shifted laterally so that the hole 57 becomes coaxial with the shaft 45 to seat in the selected one of grooves 51, 53 or 55. As can be seen in FIGURE 1, the three different grooves will hold the cup 43 to retain the coil spring 33 at three substantially different places, thus providing a relatively wide range of adjustments of the spring. These adjustments are fixed and therefore the force supplied by the spring on the diaphragm can be predetermined. Additionally, this force may not be tampered with or adjusted without removing the cap 49 which can be sealed or locked in place by any suitable means.

Modifications can be made without departing from the spirit and scope of the subjoined claims.

I claim:

1. In an automatic pressure regulating valve having a body containing a diaphragm and a two-ended coil spring with one end acting against the diaphragm, the combination of a spring retainer for acting against the other end of the spring, a support member for the retainer supported in the body, said retainer being telescoped in the body, said retainer being telescoped on the member, and connection means between the retainer and member operable by relative lateral movement between them for securing the retainer to the member at different positions thereon.

2. A device as set forth in claim 1 wherein said support member comprises a shaft and said connection means comprises spaced grooves formed on the shaft.

3. A device as set forth in claim 2 wherein said retainer comprises a cup formed of flexible material and said connection means comprises communicating holes in a wall of the cup, one of said holes being substantially the size of the shaft and the other being substantially the size of the grooves.

4. A device as set forth in claim 3 wherein the valve body has a spring stack closed by a plug and said support member is secured to said plug and centrally located in said stack.

References Cited

UNITED STATES PATENTS 3,289,692   12/1966   Dunn _____ 137—505.41 XR

WILLIAM F. O'DEA, *Primary Examiner.*

H. W. WEAKLEY, *Assistant Examiner.*